US008935345B2

(12) United States Patent
Watanabe et al.

(10) Patent No.: US 8,935,345 B2
(45) Date of Patent: Jan. 13, 2015

(54) INFORMATION PROVIDING APPARATUS, INFORMATION PROVIDING METHOD, INFORMATION PROVIDING PROGRAM, AND COMPUTER-READABLE RECORDING MEDIUM HAVING INFORMATION PROVIDING PROGRAM RECORDED THEREIN

(75) Inventors: Masahiro Watanabe, Shinagawa-ku (JP); Manabu Oshiro, Shinagawa-ku (JP); Noriko Harada, Shinagawa-ku (JP); Hidekazu Hamada, Shinagawa-ku (JP); Reiko Yasuda, Shinagawa-ku (JP); Teppei Hida, Shinagawa-ku (JP); Yuko Furusho, Shinagawa-ku (JP); Koichi Yanagimoto, Shinagawa-ku (JP); Ai Shimogori, Shinagawa-ku (JP)

(73) Assignee: Rakuten, Inc., Tokyo (JP)

( * ) Notice: Subject to any disclaimer, the term of this patent is extended or adjusted under 35 U.S.C. 154(b) by 21 days.

(21) Appl. No.: 13/581,414

(22) PCT Filed: May 31, 2011

(86) PCT No.: PCT/JP2011/062532
§ 371 (c)(1),
(2), (4) Date: Aug. 27, 2012

(87) PCT Pub. No.: WO2011/152420
PCT Pub. Date: Dec. 8, 2011

(65) Prior Publication Data
US 2013/0080549 A1    Mar. 28, 2013

(30) Foreign Application Priority Data
May 31, 2010    (JP) .................................. 2010-123683

(51) Int. Cl.
*G06F 15/16*    (2006.01)
*H04L 12/58*    (2006.01)
(Continued)

(52) U.S. Cl.
CPC .............. *H04L 51/00* (2013.01); *G06Q 10/107* (2013.01); *G06Q 50/01* (2013.01)
USPC ........................................................ 709/206

(58) Field of Classification Search
USPC ........................................................ 709/206
See application file for complete search history.

(56) References Cited

U.S. PATENT DOCUMENTS 7,720,723 B2    5/2010    Dicker et al.
8,090,621 B1    1/2012    Chakrabarti et al.
(Continued)

FOREIGN PATENT DOCUMENTS

JP    2001-306927 A    11/2001
JP    2002-15219 A    1/2002
(Continued)

OTHER PUBLICATIONS

English translation of JP 2002-015219.*
(Continued)

*Primary Examiner* — Tu Nguyen
(74) *Attorney, Agent, or Firm* — Sughrue Mion, PLLC

(57) ABSTRACT

The server 11 includes a recommendation email generation unit 72 that generates a recommendation email for recommending a recommended object to a plurality of second users based on recommendation information indicating that a first user recommends a specified recommended object to the plurality of second users, a recommendation email sending unit 73 that sends the recommendation email to the plurality of second users, a purchase email generation unit 74 that, when one of the plurality of second users applies for the recommended object indicated in the recommendation email and becomes an applicant for the recommended object, generates an application email containing application information indicating an application for the recommended object, and a purchase email sending unit 75 that sends the application email to the second users other than the applicant.

14 Claims, 14 Drawing Sheets

(51) Int. Cl.
*G06Q 10/10* (2012.01)
*G06Q 50/00* (2012.01)

(56) References Cited

U.S. PATENT DOCUMENTS

| | | | |
|---|---|---|---|
| 8,260,656 | B1 | 9/2012 | Harbick et al. |
| 8,275,674 | B2 | 9/2012 | Kane, Jr. et al. |
| 2002/0107758 | A1 | 8/2002 | Takakura et al. |
| 2007/0252004 | A1 | 11/2007 | Shiraki et al. |
| 2008/0235078 | A1 | 9/2008 | Hong et al. |
| 2008/0255933 | A1* | 10/2008 | Leventhal et al. ............ 705/14 |
| 2008/0255934 | A1* | 10/2008 | Leventhal et al. ............ 705/14 |
| 2009/0106081 | A1* | 4/2009 | Burgess et al. ............ 705/10 |
| 2010/0115037 | A1 | 5/2010 | Hull et al. |
| 2012/0296764 | A1 | 11/2012 | Poon et al. |
| 2013/0103494 | A1 | 4/2013 | Leventhal |

FOREIGN PATENT DOCUMENTS

| | | |
|---|---|---|
| JP | 2002-230411 A | 8/2002 |
| JP | 2003-016336 A | 1/2003 |
| JP | 2004-265013 A | 9/2004 |
| JP | 2007-115220 A | 5/2007 |
| JP | 2007-317177 A | 12/2007 |
| JP | 2008-234436 A | 10/2008 |
| JP | 2009-237894 A | 10/2009 |
| JP | 2010-165097 A | 7/2010 |

OTHER PUBLICATIONS

United States Office Action dated Aug. 14, 2013, issued in U.S. Appl. No. 13/636,460.
Translation of the International Preliminary Report on Patentability mailed Jan. 17, 2013 in International Application No. PCT/JP2011/062532.
Translation of the International Preliminary Report on Patentability mailed Jan. 17, 2013 in International Application No. PCT/JP2011/062524.
Search Report mailed Aug. 3, 2011 in International Application No. PCT/JP2011/062524.
United States Office Action dated May 22, 2013, issued in U.S. Appl. No. 13/636,460.
International Search Report for PCT/JP2011/062532 dated Aug. 23, 2011.
United States Office Action dated Feb. 5, 2014 issued in U.S. Appl. No. 13/636,460.

* cited by examiner

| USER ID | FRIEND ID |
|---------|-----------|
| 001 | 002,003 |
| 002 | 001 |
| 003 | 001 |
| 004 | 005,006 |
| ... | ... |

Fig.3

| USER ID<br>IN ONLINE SHOPPING SITE | USER ID IN SNS | USER ID<br>IN ANOTHER SERVICE |
|---|---|---|
| 001 | 1001 | 2001 |
| 002 | 1002 | 1002 |
| 003 | 1003 | 2003 |

Fig.7

| RECOMMENDER ID | THE OTHER PERSON ID | SENT DATE AND TIME | NICKNAME | RECOMMENDED PRODUCT | PURCHASE RECORD | PURCHASED DATE AND TIME | NUMBER OF EMAILS | INTEREST | CATEGORY |
|---|---|---|---|---|---|---|---|---|---|
| 001 | 101 | 2010.05.06 | USER K | PRODUCT A | PURCHASE | 2010.05.06 | 8 | WATCHING BASEBALL GAMES | SPORT/ SPORT GOODS/ TICKET |
| | 102 | 2010.05.06 | USER J | PRODUCT A | NO PURCHASE | — | 6 | MOVIES | INDOORS/ MOVIE |
| | 103 | 2010.04.26 | USER L | PRODUCT B | PURCHASE | 2010.04.30 | 15 | READING | BOOK |
| | 104 | 2010.05.06 | USER M | PRODUCT A | PURCHASE | 2010.05.07 | 3 | CLASSICAL MUSIC | CD/ CLASSICAL |
| ⋮ | ⋮ | ⋮ | ⋮ | ⋮ | ⋮ | ⋮ | ⋮ | ⋮ | ⋮ |

Fig.9

| LOGIN PAGE |
|---|

| FOR REGISTERED USERS |
|---|
| ENTER USER ID AND PASSWORD, THEN PRESS "NEXT" |

| USER ID | | <HALF-WIDTH CHARACTERS> |
|---|---|---|
| PASSWORD | | <HALF-WIDTH CHARACTERS> |

NEXT

*Fig.10*

RECOMMEND TO FRIENDS

SENT TO:

☑ USER K

☑ USER J

☑ USER M

☐ USER L

YOUR EMAIL ADDRESS    aaa@xxx.com
YOUR NAME                       USER R
COMMENTS OF RECOMMENDATION (TEXT OF EMAIL)

This is a good item!

FOLLOWING INFORMATION IS SHOWN
AT THE BOTTOM OF EMAIL

■PRODUCT NAME HARD WOODEN BAT
　　http://bbb.co.jp/ccc

■SHOP NAME  SHOP Y
　　http:/ddd.co.jp/eee

SEND

INFORMATION PROVIDING APPARATUS, INFORMATION PROVIDING METHOD, INFORMATION PROVIDING PROGRAM, AND COMPUTER-READABLE RECORDING MEDIUM HAVING INFORMATION PROVIDING PROGRAM RECORDED THEREIN

CROSS REFERENCE TO RELATED APPLICATIONS

This application is a National Stage of International Application No. PCT/JP2011/062532 filed May 31, 2011, claiming priority based on Japanese Patent Application No. 2010-123683 filed May 31, 2010, the contents of all of which are incorporated herein by reference in their entirety.

TECHNICAL FIELD

One embodiment of the present invention relates to an information providing apparatus, an information providing method, an information providing program, and a computer-readable recording medium having the information providing program recorded therein.

BACKGROUND ART

Systems for recommending various recommended objects to others through Web sites are known. For example, Patent Literature 1 describes a sales promotion system for facilitating sales promotion of products by introduction. In this sales promotion system, an introducer who has purchased products using a mobile terminal selects a product desired to be recommended to others from the products for which the payment is done, and a recommendation advertising ID of the selected product is provided to a person to whom introduction is made. Further, Patent Literature 2 describes a membership management system that introduces others to become a member using a mobile terminal. In this membership management system, when a first mobile terminal notifies the email address of a second mobile terminal to a server, the server notifies the URL of an application to be downloaded when becoming a member to the second terminal by email.

CITATION LIST

Patent Literature

PTL 1: JP 2008-234436 A
PTL 2: JP 2009-237894 A

SUMMARY OF INVENTION

Technical Problem

However, simply recommending a recommended object to others results in difficulty to raise the other person's interest in the recommended object. This means, from the recommender's point of view, that the recommendation made does not affect the other person, and the recommender cannot receive satisfaction. Accordingly, it is demanded to increase the satisfaction level of a user who recommends a recommended object to others.

Solution to Problem

An information providing apparatus according to one aspect of the invention includes a first acquisition unit that acquires recommendation information indicating that a first user recommends a specified recommended object to a plurality of second users from a terminal of the first user, a first generation unit that generates a recommendation email for recommending the recommended object to the plurality of second users based on the recommendation information, a first sending unit that sends the recommendation email to the plurality of second users, a second acquisition unit that, when one of the plurality of second users applies for the recommended object indicated in the recommendation email and becomes an applicant for the recommended object, acquires application information indicating an application for the recommended object from a terminal of the applicant, a second generation unit that generates an application email containing the application information, and a second sending unit that sends the application email to the second users other than the applicant.

An information providing method according to one aspect of the invention is an information providing method executed by an information providing apparatus, which includes a first acquisition step of acquiring recommendation information indicating that a first user recommends a specified recommended object to a plurality of second users from a terminal of the first user, a first generation step of generating a recommendation email for recommending the recommended object to the plurality of second users based on the recommendation information, a first sending step of sending the recommendation email to the plurality of second users, a second acquisition step of, when one of the plurality of second users applies for the recommended object indicated in the recommendation email and becomes an applicant for the recommended object, acquiring application information indicating an application for the recommended object from a terminal of the applicant, a second generation step of generating an application email containing the application information, and a second sending step of sending the application email to the second users other than the applicant.

An information providing program according to one aspect of the invention causes a computer to implement a first acquisition unit that acquires recommendation information indicating that a first user recommends a specified recommended object to a plurality of second users from a terminal of the first user, a first generation unit that generates a recommendation email for recommending the recommended object to the plurality of second users based on the recommendation information, a first sending unit that sends the recommendation email to the plurality of second users, a second acquisition unit that, when one of the plurality of second users applies for the recommended object indicated in the recommendation email and becomes an applicant for the recommended object, acquires application information indicating an application for the recommended object from a terminal of the applicant, a second generation unit that generates an application email containing the application information, and a second sending unit that sends the application email to the second users other than the applicant.

A computer-readable recording medium according to one aspect of the invention has an information providing program recorded therein, the program causing a computer to implement a first acquisition unit that acquires recommendation information indicating that a first user recommends a specified recommended object to a plurality of second users from a terminal of the first user, a first generation unit that generates a recommendation email for recommending the recommended object to the plurality of second users based on the recommendation information, a first sending unit that sends the recommendation email to the plurality of second users, a second acquisition unit that, when one of the plurality of second users applies for the recommended object indicated in the recommendation email and becomes an applicant for the recommended object, acquires application information indicating an application for the recommended object from a terminal of the applicant, a second generation unit that generates an application email containing the application information, and a second sending unit that sends the application email to the second users other than the applicant.

In the above aspects, when any one of the plurality of users who have received the recommendation email applies for the recommended object indicated in the recommendation email, the application email indicating the application is generated and sent to the second users other than the applicant. In this manner, by showing the fact that someone has actually applied for the recommended object to the second users who have not yet applied for the recommended object, it is expected that an intention to apply for the recommended object occurs to the second users. If the other second users apply for the recommended object in response to the application email, it is expected that the satisfaction level of the first user as the recommender increases.

The information providing apparatus according to another aspect further may include a selection unit that selects a plurality of candidates for the second users by reference to a first storage unit that stores recommendation data associating the first user and the second users, and transmits candidate information indicating the selected plurality of candidates to the terminal of the first user, and the first acquisition unit may acquire the recommendation information indicating the plurality of second users specified from the candidates indicated by the candidate information in the terminal of the first user. In this case, because candidates for the second users are presented to the first user, the first user can easily select the second users.

In the information providing apparatus according to yet another aspect, the recommendation data may contain sent date and time of the recommendation email which has been recently sent to the second users as attribute information of the second users, and the selection unit may select the plurality of candidates in descending order of the sent date and time. In this manner, by preferentially presenting the second users to whom the recommendation email has been recently sent as candidates to the first user, the first user can easily select those who are expected to apply for the recommended object.

In the information providing apparatus according to yet another aspect, the recommendation data may contain a sent date and time of the recommendation email which has been recently sent to the second users, a recommended object indicated in the recommendation email, and applied date and time for the recommended object as attribute information of the second users, and the selection unit may select the plurality of candidates in order of time from the sent date and time to the applied date and time, from shortest to longest. In this manner, by preferentially presenting the second users who have applied for the recommended object in quick response to the recommendation email as candidates to the first user, the first user can easily select those who are expected to apply for the recommended object.

In the information providing apparatus according to yet another aspect, the recommendation data may contain the number of recommendation emails sent to the second users as attribute information of the second users, and the selection unit may select the plurality of candidates in descending order of the number of recommendation emails. In this manner, by preferentially presenting the second users who have received many recommendation emails as candidates to the first user, the first user can easily select those who are expected to apply for the recommended object.

In the information providing apparatus according to yet another aspect, the recommendation data may contain a category of a recommended object corresponding to an interest of the second users as attribute information of the second users, and the selection unit may select the plurality of candidates in order of degree of coincidence between a category of a recommended object recommended by the first user and a category of a recommended object indicated by the recommendation data, from highest to lowest. In this manner, by preferentially presenting the second users who have an interest with a high degree of coincidence with the category of the recommended object as candidates to the first user, the first user can easily select those who are expected to apply for the recommended object.

In the information providing apparatus according to yet another aspect, the selection unit may refer to a second storage unit that stores relationship data indicating a relationship between users represented by a directed graph and specify the second users in a two-way friend relationship with the first user, the second users in a one-way friend relationship to the first user and the second users in a one-way friend relationship from the first user as a first group, a second group and a third group, respectively, and select the plurality of candidates in order of the first group, the second group and the third group. In this manner, by determining candidates for the second users based on the strength or direction of a friend relationship, the first user can easily select those who are expected to apply for the recommended object.

In the information providing apparatus according to yet another aspect, the selection unit may refer to a third storage unit that stores a sent history indicating sent date and time of a recommendation email is sent and a recommended object indicated in the recommendation email and a fourth storage unit that stores an application history indicating recommended objects applied by the second users and applied date and time, and select the plurality of candidates in order of difference between the sent date and time and the applied date and time, from smallest to largest, corresponding to other recommended objects in the same category as the recommended object indicated in the recommendation email generated by the first generation unit. In this manner, by preferentially presenting the second users who have applied for the recommended object in quick response to the recommendation email as candidates to the first user, the first user can easily select those who are expected to apply for the recommended object.

In the information providing apparatus according to yet another aspect, the selection unit may refer to a fifth storage unit that stores a viewing history indicating recommended objects viewed by the second users and viewed date and time, and select the plurality of candidates in order of the number of views of other recommended objects in the same category as the recommended object indicated in the recommendation email generated by the first generation unit. In this manner, by preferentially presenting the second users who have often viewed other recommended objects in the same category as the recommended object indicated in the recommendation email as candidates to the first user, the first user can easily select those who are expected to apply for the recommended object.

In the information providing apparatus according to yet another aspect, the selection unit may refer to a sixth storage unit that stores an application history indicating recommended objects applied by the second users and applied date and time, and select the plurality of candidates in order of the number of applications for other recommended objects in the same category as the recommended object indicated in the recommendation email generated by the first generation unit. In this manner, by preferentially presenting the second users who have often applied for other recommended objects in the same category as the recommended object indicated in the recommendation email as candidates to the first user, the first user can easily select those who are expected to apply for the recommended object.

In the information providing apparatus according to yet another aspect, the recommended object may be a product, and the application for the recommended object may be an application for purchase of a product.

Advantageous Effects of Invention

According to one aspect of the present invention, it is possible to increase the satisfaction level of a user who recommends a recommended object to others.

BRIEF DESCRIPTION OF DRAWINGS

FIG. 3 is a diagram showing an example of a user ID translation table shown in FIG. 1.

FIG. 7 is a diagram showing an example of a recommendation history.

FIG. 9 is a diagram showing an example of an authentication page.

FIG. 10 is a diagram showing an example of a recommendation email send page.

DESCRIPTION OF EMBODIMENTS

An embodiments of the present invention is described hereinafter in detail with reference to the appended drawings. In the description of the drawings, the same or equivalent elements are denoted by the same reference symbols, and the redundant explanation thereof is omitted.

Figure 1:
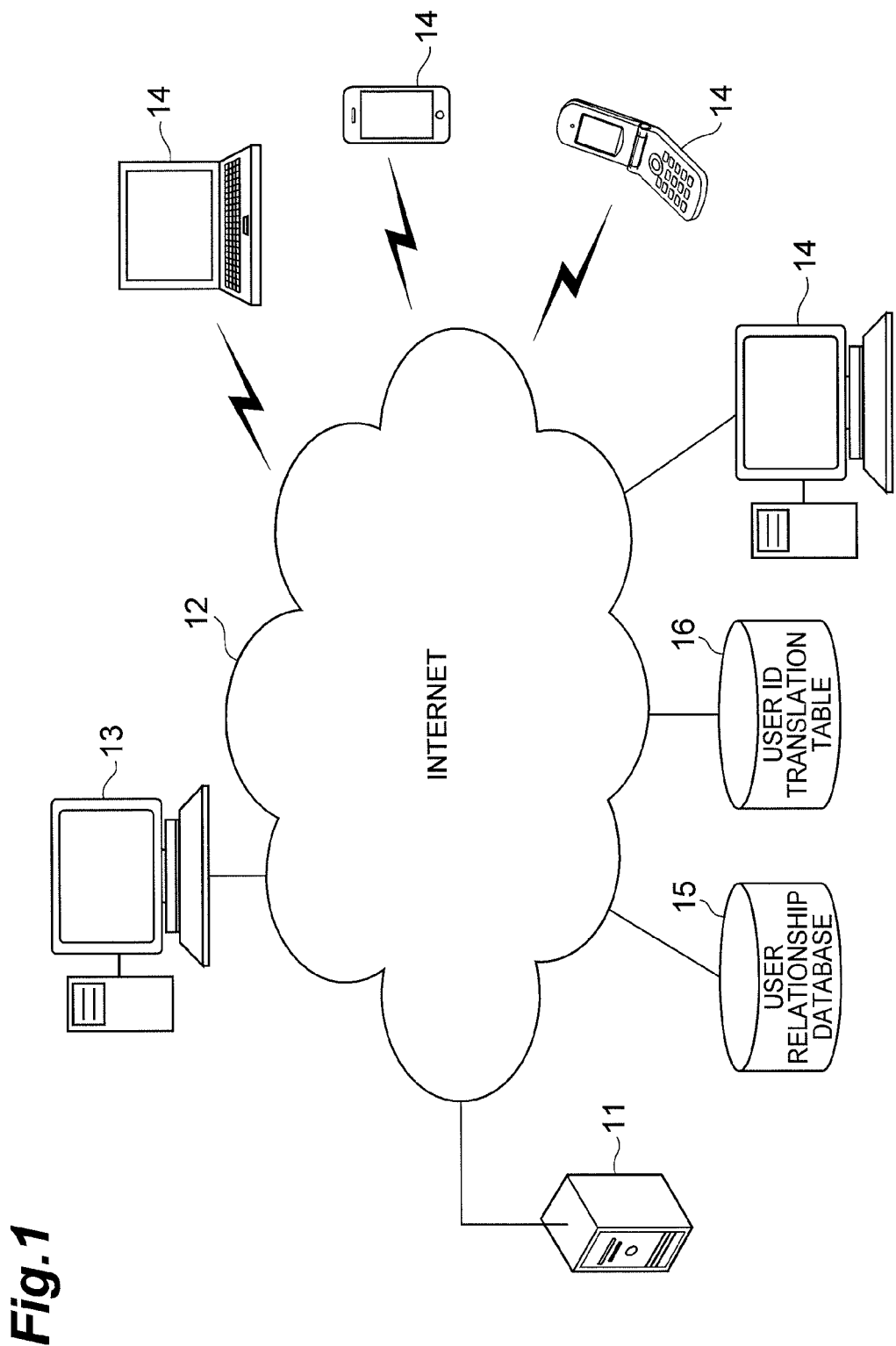
FIG. 1 is a diagram showing an overall configuration of an information providing system according to an embodiment.

FIG. 1 is a diagram showing a configuration of an information providing system 1 according to an embodiment. The information providing system 1 includes a server 11, Internet 12, a client 13, clients 14, a user relationship database 15 (second storage unit), and a user ID translation table 16. The server 11 is connected with the clients 13 and 14, the user relationship database 15 and the user ID translation table 16 through the Internet and can thereby communicate in two way with the clients 13 and 14, the user relationship database 15 and the user ID translation table 16.

The server 11 is an information providing apparatus that provides a Web page for selling products to the client 13 or the clients 14 and receives an application for purchase of a product from the client 13 or the clients 14. In other words, the server 11 provides an online shopping site to users. Note that the product may be a tangible item or an intangible item such as a service. The server 11 may be a dedicated server, a personal computer, a virtual server, or a system combining those.

The Internet 12 is an example of a communication network. The Internet 12 is a wired or wireless public network or private network, LAN (Local Area Network), WAN (Wide Area Network) or the like.

The clients 13 and 14 are terminals with browser and email functions. The clients 13 and 14 acquire a Web page from the server 11 according to user operation and display the page on the browser. Further, the clients 13 and 14 receive emails sent from the server 11. Examples of the clients 13 and 14 include a personal computer, a cellular phone and the like, though the types of the clients 13 and 14 are not limited thereto.

The user relationship database 15 is a means of storing relationship data indicating a relationship between users. In this embodiment, the user relationship database 15 is placed within a computer system that controls a social networking service (SNS) and resides separately from the server 11. However, a place to put this database is not particularly limited, and the server 11 may include the user relationship database 15, for example.

Figure 2:
FIG. 2 is a diagram showing an example of a user relationship database shown in FIG. 1.

As shown in FIG. 2, the relationship data is data in which the user ID of one user and the ID (friend ID) of a user who is a friend of the user in SNS are associated with each other. The data of the first to third rows of FIG. 2 shows that a user identified by the user ID "001" has a two-way friend relationship with two users identified by the user IDs "002" and "003". The friend relationship, however, may be one way. For example, in the case where the data of the second and third rows of FIG. 2 does not exist, although the user identified by the user ID "001" have a friend relationship with the two users identified by the user IDs "002" and "003", when viewed from the two users, the user identified by the user ID "001" is a stranger to them. In this manner, the relationship data indicates a relationship between users represented by a directed graph.

The user ID translation table 16 is means of storing the correspondence of user IDs between systems. One user does not always use one single user ID in common among a plurality of systems, and the user uses different user IDs for different systems in some cases. For example, there is a case where a user ID managed by an online shopping site (the server 11) and a user ID managed by SNS (the user relationship database 15) are different. Because the user ID translation table 16 is used to compensate for such a difference in user ID between systems, the user ID translation table 16 is not needed if the ID of each user is completely identical between systems. A place to put the user ID translation table 16 is not particularly limited, and it may be included in the server 11 or in the same system as the user relationship database 15.

Data in the user ID translation table 16 is generated by exchanging tokens in OAuth, which is an architecture for delegation of approval information, between services. In the example of FIG. 3, data in the first row indicates that a user identified by the user ID "001" in the online shopping site (the server 11) is registered with the user ID "1001" in SNS and registered with the user ID "2001" in another service. Note that, in some cases, the same user ID is assigned to a single user between sites, like the user ID "1002" in the second row.

The server 11 will be described specifically. The server 11 sends an email for recommending a product (recommendation email) to one or more users of the clients 14 in response to an instruction from the client 13. Hereinafter, a user (first user) of the client 13 who makes recommendation for a product is referred to as a recommender, and users (second users) of the clients 14 who receive recommendation for a product is referred to as the other users. Note that, in Japanese patent application No. 2010-123683 filed on May 31, 2010, upon which the application is based and from which the benefit of priority is claimed, the other user is referred as "person to whom recommendation is made". When the other user who has received the recommendation email purchases a product that is recommended (which is hereinafter referred to also as "recommended product") and becomes a purchaser of the product, the server 11 sends an email indicating purchase of a product (purchase email) to the other users excluding the purchaser. The purchaser is one type of an applicant, and the purchase email is one type of an application email.

Figure 4:
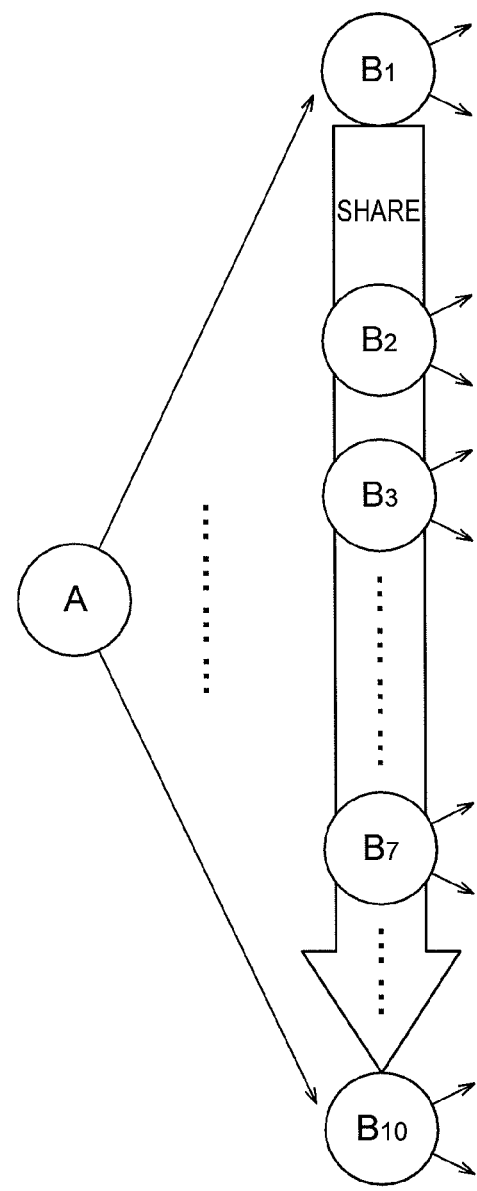
FIG. 4 is a diagram showing a concept of recommendation of a product in an embodiment.

FIG. 4 is a diagram showing recommendation of a product in the information providing system 1. In FIG. 4, A indicates a recommender, and $B_1$ to $B_{10}$ indicate the other users. In the information providing system 1, the recommender A who desires to gain rewards for introduction recommends a product to the other users by sending a recommendation email. The other users may be colleagues in the recommender's company, those who have the same interest as the recommender, those who have become acquainted with the recommender in off-line meeting, those who are registered in the same mailing list as the recommender and the like, for example.

The other users $B_1$ to $B_{10}$ do not know one another in some cases. The other users $B_1$ to $B_{10}$ do not know that the recommendation email sent to them is also sent to the other users in some cases. Accordingly, it is sometimes difficult to prompt the other users to purchase the recommended product simply by sending the recommendation email.

On the other hand, if, when the other user $B_1$, for example, purchases a product in response to the recommendation email, a message like "I bought by recommendation!" is sent as the purchase email from the other user $B_1$ to the other users $B_2$ to $B_{10}$, the other users $B_2$ to $B_{10}$ get to know that another person has actually purchased the product. By the fact that the product has been actually purchased, it is expected that an intention to purchase the product occurs to the other users $B_2$ to $B_{10}$. By promoting purchase of a product in this manner, the recommender can attain the purpose of recommendation to some extent and receive a certain degree of satisfaction.

Figure 5:
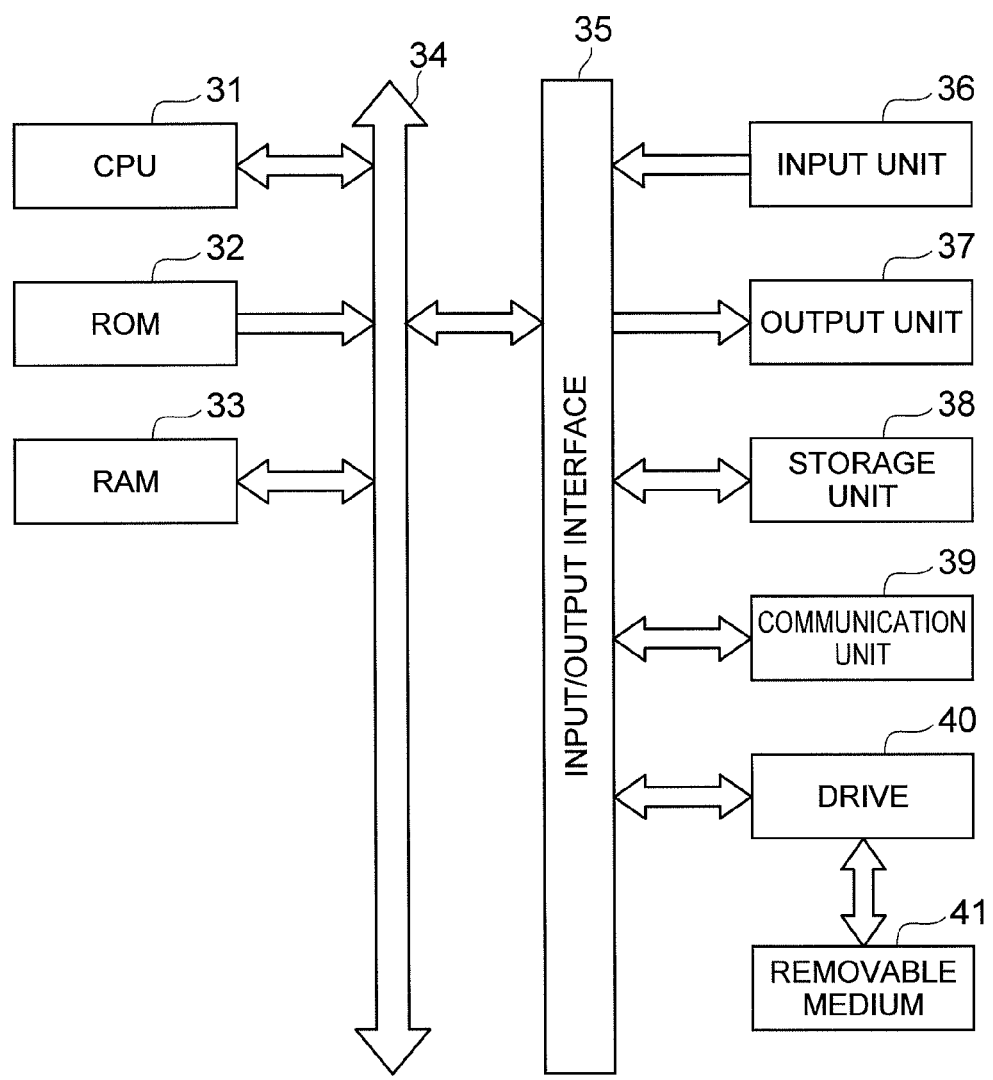
FIG. 5 is a diagram showing a hardware configuration of a server shown in FIG. 1.

FIG. 5 is a block diagram showing a hardware configuration example of the server 11. In the server 11, a CPU (Central Processing Unit) 31, ROM (Read Only Memory) 32 and RAM (Random Access Memory) 33 are connected to one another through a bus 34. An input/output interface 35 is further connected to the bus 34. To the input/output interface 35, an input unit 36 such as a keyboard, mouse or microphone, an output unit 37 such as a display or speaker, a storage unit 38 such as a hard disk or nonvolatile memory, a communication unit 39 such as a network interface, and a drive 40 that drives a removable medium 41 such as a magnetic disk, optical disk, magneto-optical disk or semiconductor memory are connected.

In the server 11, the CPU 31 loads a program stored in the storage unit 38 to the RAM 33 through the input/output interface 35 and the bus 34 and executes the program, so that processes described later are performed.

An information providing program that is executed by the server 11 (CPU 31) is provided by being recorded in the removable medium 41 such as a magnetic disk (including flexible disk), optical disk (CD-ROM or DVD-ROM), magneto-optical disk or semiconductor memory. Alternatively, the information providing program is provided through a wired or wireless transmission medium such as the Internet 12.

The information providing program may be installed to a computer by, with the removable medium 41 attached to the drive 41, being stored into the storage medium 38 through the input/output interface 35. Further, the information providing program may be installed to a computer by being received by the communication unit 39 and stored into the storage medium 38. Furthermore, the information providing program may be pre-installed to a computer.

Figure 6:
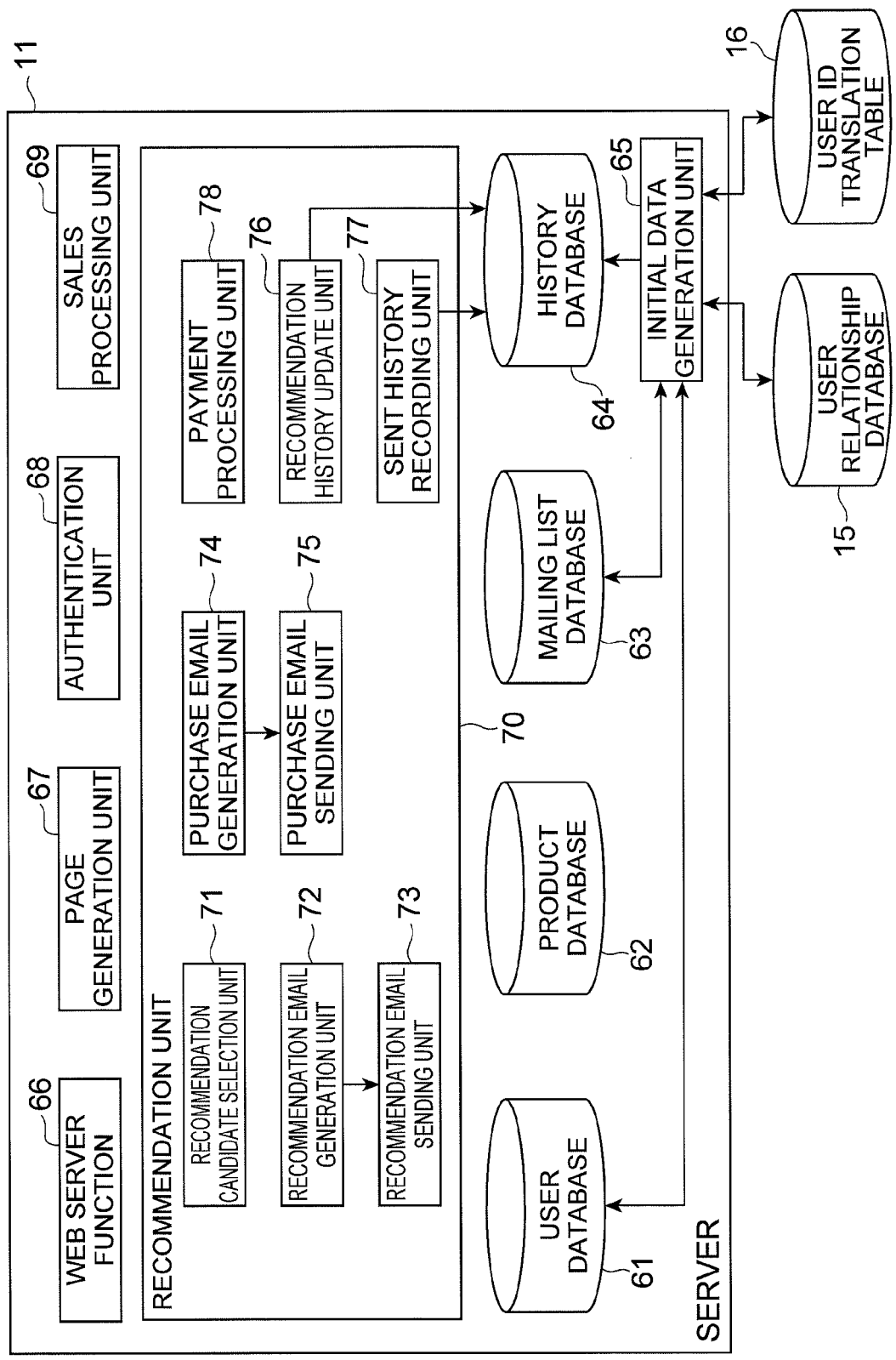
FIG. 6 is a block diagram showing a functional configuration of the server shown in FIG. 1.

FIG. 6 is a block diagram showing an example of a functional configuration of the server 11. In the server 11, by execution of the information providing program or the like, a user database 61, a product database 62, a mailing list database 63, a history database (first, third, fourth, fifth and sixth storage units) 64, an initial data generation unit 65, a Web server function (first acquisition unit, second acquisition unit) 66, a page generation unit 67, an authentication unit 68, a sales processing unit 69, and a recommendation unit 70 are implemented.

The user database 61 is a means of storing user data. The user data contains a user ID, various user attributes (name, nickname, address, telephone number, email address, interest etc.), and a login password.

The product database 62 is a means of storing product data. The product data contains a product ID that identifies a product and various product attributes (product name, product image, product category, product manufacturer or supplier name, manufacturer or supplier address, sales area or supply area, URL (Uniform Resource Locator) of a Web page selling a product, product price etc.)

The mailing list database 63 is a means of storing mailing list data. The mailing list data contains a representative email address of the mailing list and email addresses of one or more users contained in the mailing list.

The history database 64 is a means of storing various history data (viewing history, purchase history, recommendation history, and sent history).

Viewing history records contain a user ID, a product ID viewed, and viewed date and time. Purchase history (application history) records contain a user ID, a product ID purchased, and purchased date and time (applied date and time). The viewing history is generated and stored by the Web server function 66, which is described later, and the purchase history is generated and stored by the sales processing unit 69, which is described later.

The recommendation history (recommendation data) is data in which a user ID (recommender ID) that identifies a recommender and attribute information of one or more other users are associated. The attribute information of each of the other users contains a user ID (the other person ID) that identifies the other user, sent date and time of a recommendation email (for example, the recent sent date and time), the other user's name (for example, nickname), a product ID of a recommended product indicated in the recent recommendation email from the recommender, the product's past purchased record and purchased date and time (applied date and time), the number of emails sent from the recommender in the past, the other user's interest, and a product category matching the interest. Because the recommendation history is data indicating whether the other user has purchased a product or not, it can be regarded as an example of user information of the other user.

FIG. 7 shows an example of the recommendation history. In this example, the recommender ID is "001", and the other person IDs are "101" to "104". This example tells that a user K has recently purchased a recommended product A, a user J has not yet purchased the product A, and a recommendation email for the product A has not been sent to a user L. The category may be shown in a hierarchical manner such as "CD/classical". The item "category" may be eliminated from the recommendation history.

The sent history is generated and recorded for each of recommendation emails and purchase emails, which are described later. Sent history records contain an email ID that identifies an email, a user ID and email address of a recommender, user IDs and email addresses of one or more other users, sent date and time of the email, and a product ID of a recommended product indicated in the email.

The structure of each history data is not limited to the above-described examples, and it may vary in many ways. For example, email addresses of a recommender and the other users may be contained in the recommendation history rather than in the sent history.

The databases 61 to 64 may be built directly on a file system provided by an operating system or built by a database management system.

The initial data generation unit 65 is a means of generating initial data of the recommendation history and stores the generated data into the history database 64. The initial data generation unit 65 newly generates a record of the recommendation history by associating a plurality of users with each other as a recommender and the other users by reference to a database in which a relationship among users is defined. The time to generate the initial data is arbitrary, and the initial data generation unit 65 generates the initial data at regular intervals or in response to an instruction from an administrator of the server 11. There are various methods for generating the initial data of the recommendation history as described below.

The initial data generation unit 65 may generate the initial data by reference to the user database 61 and the user relationship database 15. In the case where a user ID in the user database 61 and a user ID in the user relationship database 15 are different from each other, the initial data generation unit 65 translates the user ID in the user relationship database 15 into the user ID in the user database 61 in advance by reference to the user ID translation table 16.

The initial data generation unit 65 sets one user ID in the user database 61 as a recommender ID and reads another user ID corresponding to the user ID from the user relationship database 15. When one or more other user IDs can be acquired, the initial data generation unit 65 sets the user IDs as the other person IDs. Next, the initial data generation unit 65 specifies the user name and interest of each of the other users by reading the user data of each of the other users from the user database 61. Then, the initial data generation unit 65 specifies the category of each of the other users. The initial data generation unit 65 specifies the category by prompting the other user to enter the category through a certain Web page or extracting a product category corresponding to the interest based on a prestored certain correspondence table.

After specifying the user IDs of the recommender and the other users and the user name, interest and category of each of the other users, the initial data generation unit 65 generates the initial data of the recommendation history using those data and stores the initial data into the history database 64.

The example of FIG. 7 is based on the assumption that the initial data generation unit 65 reads the other person IDs "101", "102", "103" and "104" corresponding to the recommender ID "001" from the user relationship database 15, specifies the user name, interest and category of each of those four other users, and generates four records related to the recommender ID "001".

The initial data generation unit 65 executes the above-described initial data generation process for each of the user IDs in the user database 61. In the case where the corresponding other user ID is not found in the user relationship database 15, the initial data generation unit 65 ends the process at this point, and therefore the recommendation history is not always generated for all user IDs in the user database 61, The initial data generation unit 65 may generate the initial data of the recommendation history by reference to the user database 61 and the mailing list database 63. The initial data generation unit 65 sets a user ID corresponding to the representative email address indicated by the mailing list data as the recommender ID. Further, the initial data generation unit 65 sets one or more user IDs corresponding to the other email addresses that belong to the same group as the representative email address as the other person IDs. The user ID corresponding to each email address can be obtained by reference to the user data. Then, the initial data generation unit 65 specifies the user name, interest and category of each of the other users, as described above, and generates and stores the initial data of the recommendation history.

As described above, the initial data generation unit 65 can generate the initial data of the recommendation history if the relationship among users is defined in the database such as the user relationship database 15 or the mailing list database 63. The items that are blank at the time of generating the initial data (sent date and time, recommended product, past purchased record, purchased date and time, number of emails) are updated by processing of the recommendation unit 70, which is described later.

The Web server function 66 transmits a Web page written in an arbitrary markup language (for example, HTML (Hypertext Markup Language), compact HTML, HDML (Handheld Device Markup Language), XML (Extensible Markup Language)) to the client 13 or the clients 14 on the basis of the procedure specified by HTTP (Hypertext Transfer Protocol). The Web page contains various kinds of objects such as text or images. Further, the Web server function 66 receives various kinds of data that are transmitted from the client 13 or the clients 14. The Web server function 66 monitors access to the Web page by users of the clients 13 and 14 and, each time access is made, generates the viewing history and stores it into the history database 64. The Web server function 66 is implemented by executing a Web server program.

The page generation unit 67 is a means of generating a Web page to be transmitted to the clients 13 and 14 through the Web server function 66.

Figure 8:
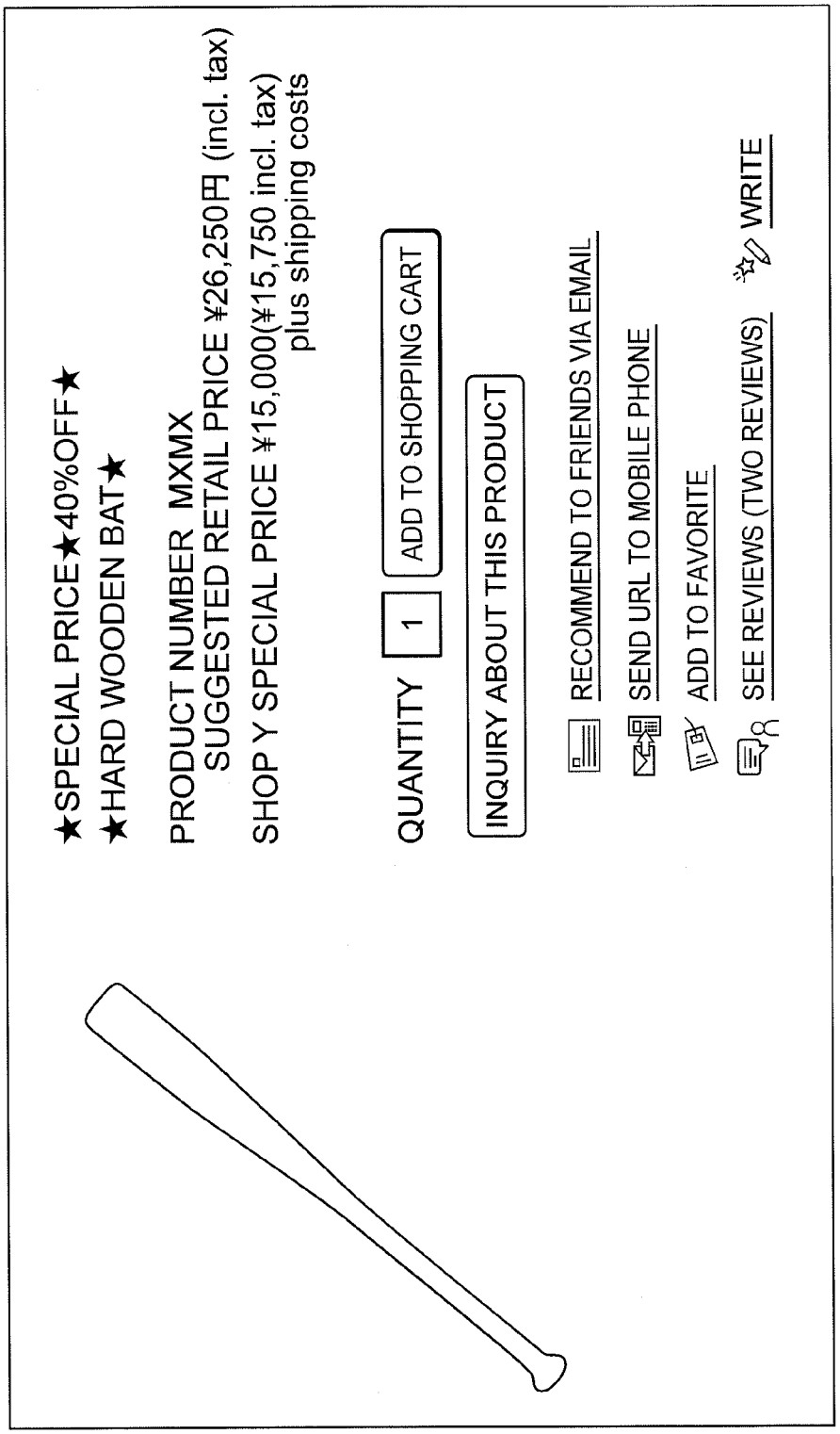
FIG. 8 is a diagram showing an example of a sales page.
Figure 11:
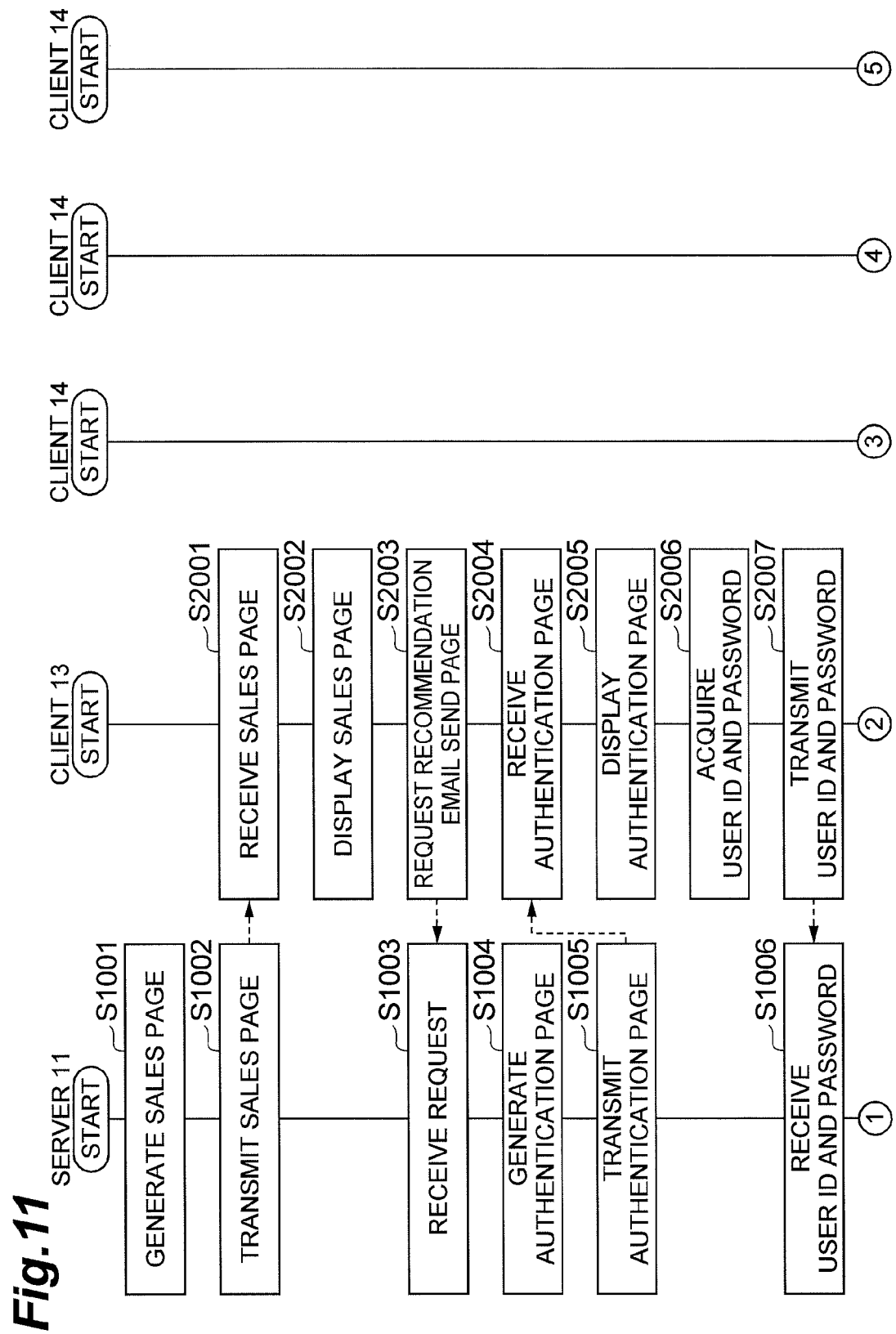
FIG. 11 is a sequence chart showing an operation of the information providing system shown in FIG. 1.
Figure 12:
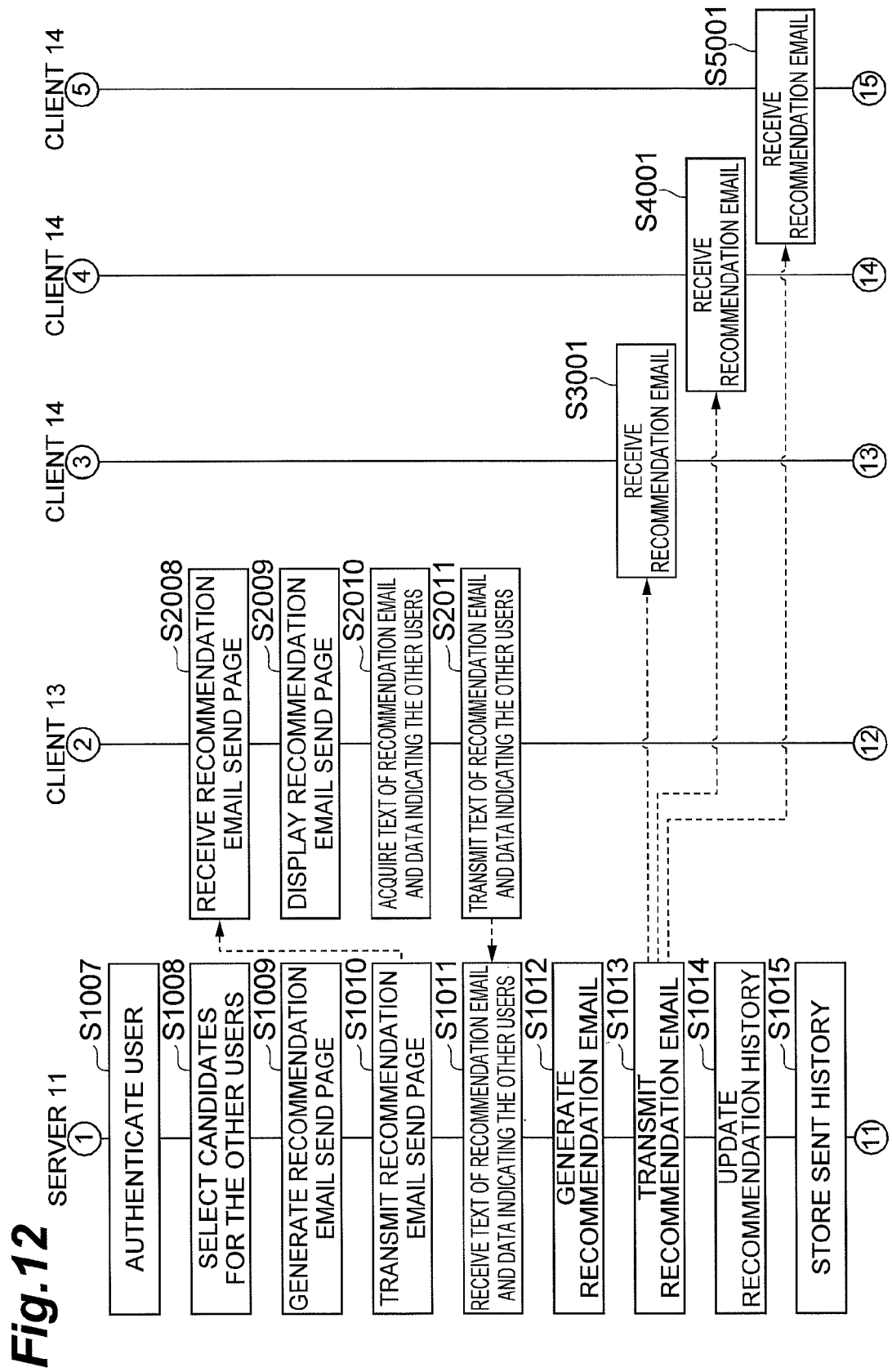
FIG. 12 is a sequence chart showing an operation of the information providing system shown in FIG. 1.
Figure 13:
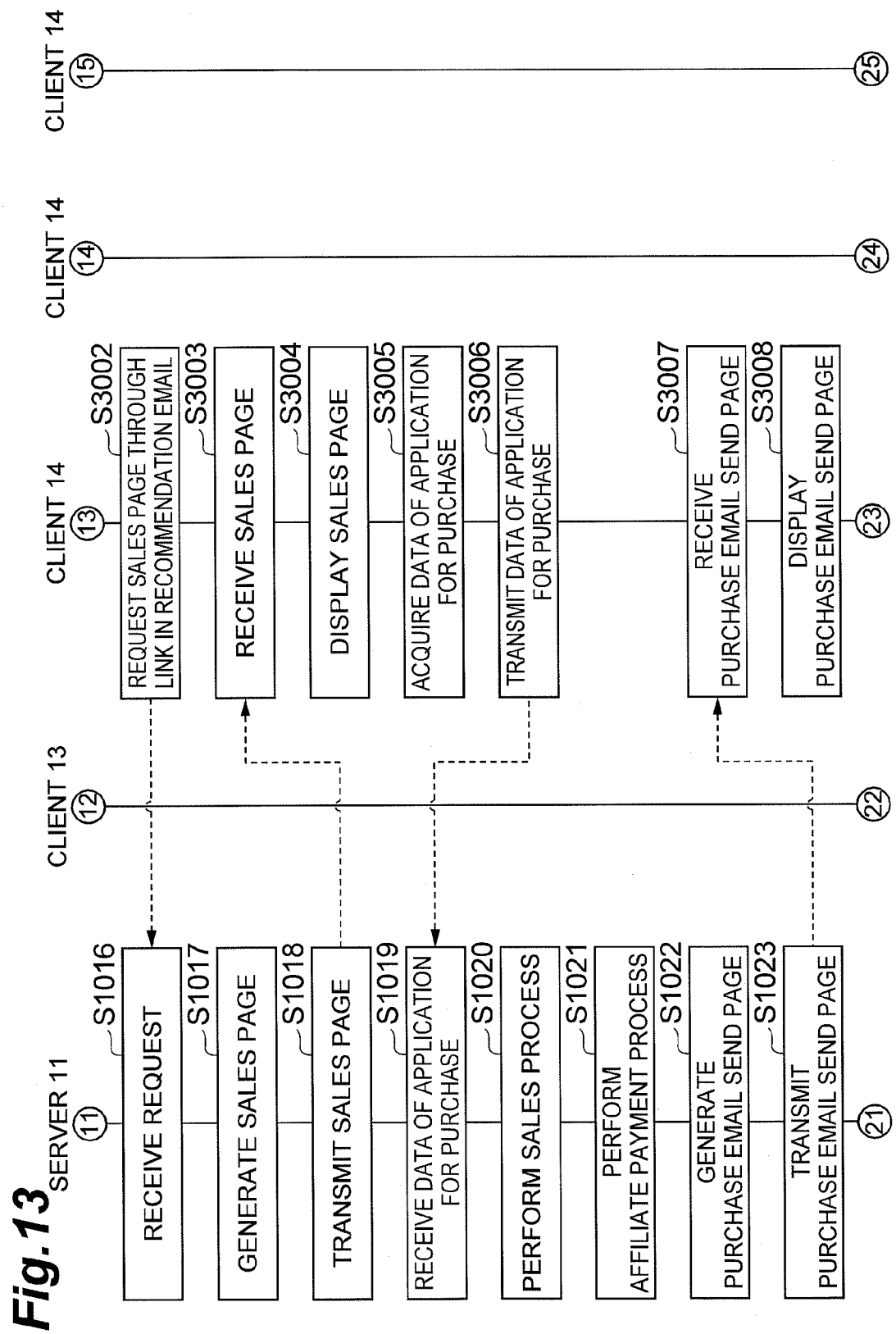
FIG. 13 is a sequence chart showing an operation of the information providing system shown in FIG. 1.
Figure 14:
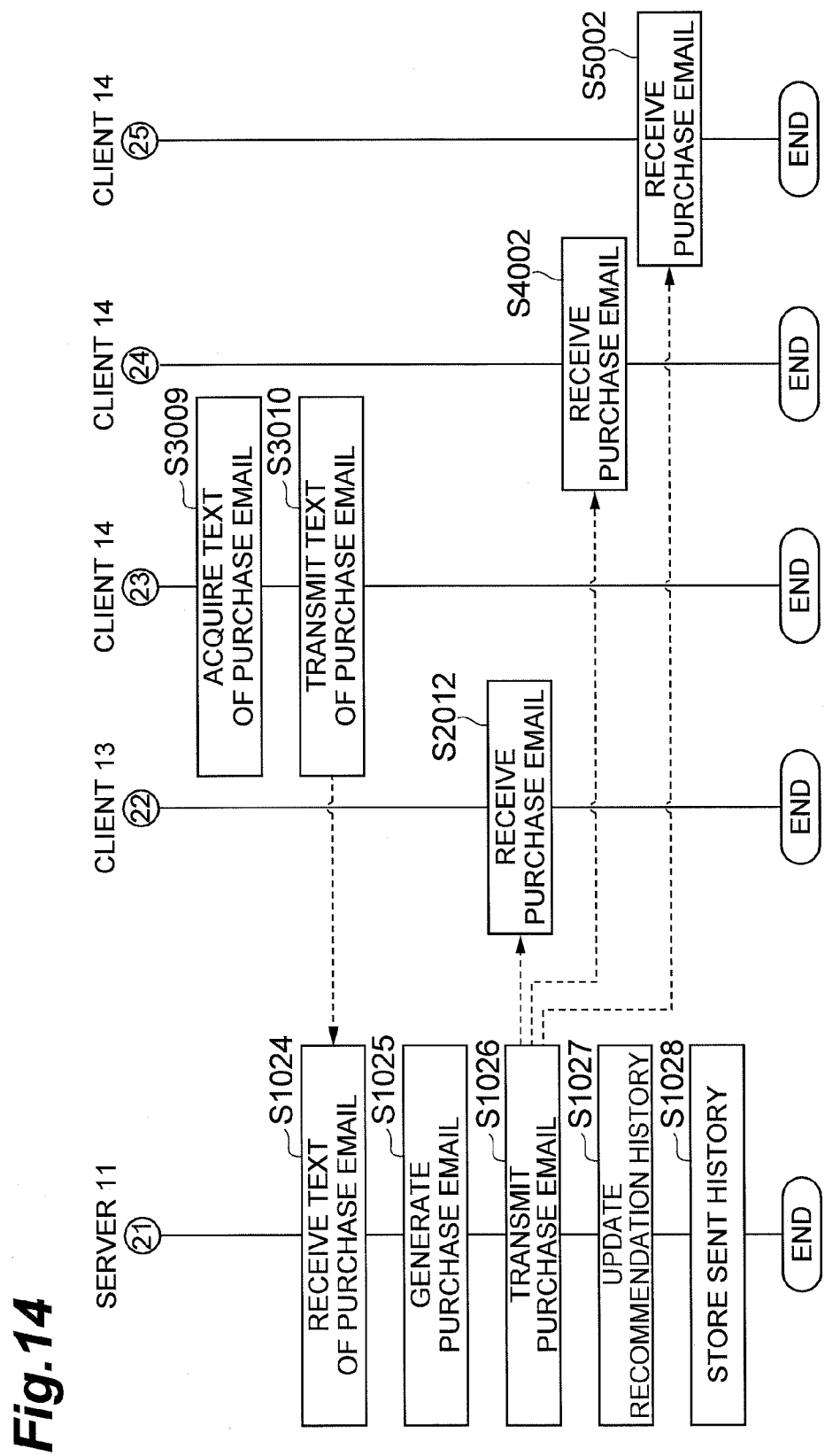
FIG. 14 is a sequence chart showing an operation of the information providing system shown in FIG. 1.

The page generation unit 67 generates a Web page (sales page) for performing a purchase procedure of a product in response to HTTP request from the client 13. The page generation unit 67 acquires product data corresponding to the HTTP request from the product database 62 and generates a sales page using the product data. As shown in FIG. 8, in the sales page, product information such as a product name ("wooden bat"), product image and product price, a "shopping cart" button for adding a product to a shopping cart, a link to send a recommendation email about this product (a link displayed as "Recommend to friends via email") and the like are placed. The generated sales page is transmitted to the client 13 by the Web server function 66 and displayed on the client 13.

When the link "Recommend to friends via email" in the sales page is clocked, the client 13 requests a Web page for sending a recommendation email, and the Web server function 66 receives the request. In response to the request, the page generation unit 67 generates an authentication page for authenticating a user of the client 13. For example, the page generation unit 67 generates an authentication page shown in FIG. 9. The "next" button in FIG. 9 is an interface for causing the server 11 to execute an authentication process. The generated authentication page is transmitted to the client 13 by the Web server function 66 and displayed on the client 13.

When a recommender is authenticated by the input user ID and password, the page generation unit 67 generates a Web page (recommendation email send page) for prompting the recommender to enter the text of the recommendation email and select the definite other users, and transmits the recommendation email send page to the client 13 through the Web server function 66. In the client 13, the recommendation email send page is displayed, and the recommender enters the text and selects the other users.

As shown in FIG. 10, the recommendation email send page contains a list of candidates for the other users, check boxes for selecting the other users, a recommender's email address and name, a field for entering the text of a recommendation email, a recommended product's name and a store where it is available, and a button (send button) for sending the contents to the server 11. In the example of FIG. 10, the message "this is a good item!" is entered as the text of the recommendation email, and three users K, J and M are selected as the other users. The list of candidates for the other users (candidate information) is generated by a recommendation candidate selection unit 71, which is described later.

When one of the other users purchases a product (recommended product) indicated in the recommendation email and becomes a purchaser, the page generation unit 67 generates a Web page (purchase email send page) for prompting the purchaser to enter the text of a purchase email. When one of the other users clicks a link to the sales page of the recommended product indicated in the recommendation email and accesses the sales page, and then purchases the product on the sales page, the client 14 transmits data for an application of purchase (application data) to the server 11. The application data contains the user ID of the purchaser, the user ID of the recommender who has sent the recommendation email, and information indicating that access is made to the sales page from the link on the recommendation email. The page generation unit 67 generates the purchase email send page in response to the application data and sends the purchase email send page to the client 14 of the purchaser through the Web server function 66. The purchase email send page contains product information of the recommended product. Note that the text of the purchase email may be sent to the server 11 as a part of the application data.

The authentication unit 68 is a means of authenticating users of the clients 13 and 14. When a user of any of the clients 13 and 14 enters a user ID and password on the authentication page and clicks the "next" button, the client 13 or 14 transmits the user ID and password to the server 11, and the Web server function 66 receives those data. The authentication unit 68 authenticates the user by verifying the user ID and password combination.

The sales processing unit 69 is a means of performing a sales process such as arrangements for a product and billing when an application for purchase of a product is made from the client 14. The sales processing unit 69 generates a purchase history indicating purchase of a product by a user of the client 14 and stores it into the history database 64.

The recommendation unit 70 is a means of acquiring the text of a recommendation email that recommends a product from the client 13 and sending a recommendation email that contains the acquired text and product information corresponding to a product to be recommended (recommended product) to the other users. Further, the recommendation unit 70 is a means of, when one of the other users purchases a recommended product, sending a purchase email that contains a message indicating purchase of the recommended product from that user (purchaser) to the other users other than the purchaser. The process executed in the recommendation unit 70 is based on the precondition that a user of the client 13 is authenticated by the authentication unit 68.

The recommendation unit 70 includes a recommendation candidate selection unit 71, a recommendation email generation unit (first generation unit) 72, a recommendation email sending unit (first sending unit) 73, a purchase email generation unit (second generation unit) 74, a purchase email sending unit (second sending unit) 75, a recommendation history update unit 76, a sent history recording unit 77, and a payment processing unit 78.

The recommendation candidate selection unit 71 is a means of selecting candidates for the other users on the basis of the recommendation history stored in the history database 64. When a specified link (for example, the link "Recommend to friends via email" in FIG. 8) in the sales page is clicked and the recommender is authenticated, the recommendation candidate selection unit 71 executes the following process based on the user ID of the recommender. A method of selecting candidates is not particularly limited, and candidates may be selected by the method described below, for example.

First Example

The recommendation candidate selection unit 71 may read the recommendation history corresponding to the recommender ID and select all of the other users indicated in the recommendation history as candidates.

Second Example

The recommendation candidate selection unit 71 may sort the other users indicated in the recommendation history corresponding to the recommender ID by a specific item and select a specified number of the other users from the top as candidates. The item and order for sorting may be set arbitrarily.

For example, the recommendation candidate selection unit 71 may sort the other users in descending order of sent date and time or sort the other users in descending order of the number of emails sent. Further, the recommendation candidate selection unit 71 may sort the other users in order of time from sending of the recommendation email to purchase of the recommended product indicated in the email, from shortest to longest. This means to sort the other users in order of response to the recent recommendation email on the basis of a difference between the purchased date and time and the sent date and time indicated in the recommendation history. In the example of FIG. 7, sorting of the other users in order of difference between the purchased date and time and the sent date and time, from smallest to largest, results in: the user K, the user M, the user L and the user J. After sorting the others users in this manner, the recommendation candidate selection unit 71 selects a specified number of the other users from the top as candidates. The number of the other users to be selected may be set arbitrarily, such as 10, 8 or 4, for example.

By extracting candidates after sorting the other users based on the past recommendation email sent records or preferentially extracting the other user who has purchased a product in quick response to the recommendation email as a candidate, it is possible to present those who are expected to purchase the product for the recommender.

Third Example

The recommendation candidate selection unit 71 may sort the other users in order of degree of matching between the attribute of the recommended product and the interest of the other users, from highest to lowest, and select a specified number of the other users from the top as candidates. The third example is based on the premise that the recommendation history has the item "category" as shown in FIG. 7. It also based on the premise that the recommendation candidate selection unit 71 acquires the product ID of the recommended product indicated in the sales page, together with the recommender ID.

The recommendation candidate selection unit 71 reads the recommendation history corresponding to the recommender ID and reads product data corresponding to the product ID of the recommended product from the product database 62. Then, the recommendation candidate selection unit 71 compares the category indicated in each recommendation history with the category of the recommended product and sorts the recommendation history according to similarity between them. The similarity in the category is predefined as a correspondence table in an arbitrary manner, and the recommendation candidate selection unit 71 compares the two categories by reference to the correspondence table. After such sorting, the recommendation candidate selection unit 71 selects a specified number of the other users from the top as candidates. The number of the other users to be selected may be set arbitrarily.

By preferentially extracting the other user having an interest with a high degree of coincidence with the product category, it is possible to present those who are expected to purchase the product for the recommender.

Fourth Example

The recommendation candidate selection unit 71 may sort the other users on the basis of a friend relationship between the recommender and the other users and select a specified number of prospective recommendations from the top as candidates.

The recommendation candidate selection unit 71 refers to the user relationship database 15 and determines which of the following a to c the relationship between the recommender and the other user matches. Using Twitter (trademark or registered trademark) as an example, the relationship a is a relationship in which the other user and the recommender follow each other, the relationship b is a relationship in which the other user follows the recommender, and the relationship c is a relationship in which the other user is followed by the recommender.

(a) Two-way friend relationship
(b) One-way friend relationship from the other user to the recommender (there is relationship data designating the user ID of the recommender as a friend ID corresponding to the user ID of the other user, whereas there is no relationship data indicating the opposite connection)

(c) One-way friend relationship from the recommender to the other user (there is relationship data designating the user ID of the other use as a friend ID corresponding to the user ID of the recommender, whereas there is no relationship data indicating the opposite connection)

Then, the recommendation candidate selection unit 71 sorts the other users in the order of: the other users corresponding to the above relationship a (first group), the other users corresponding to the above relationship b (second group), and the other users corresponding to the above relationship c (third group). Then, the recommendation candidate selection unit 71 selects a specified number of the other users sequentially from the users of the first group as candidates. The number of the other users to be selected may be set arbitrarily.

In this manner, by determining candidates for the other users based on the strength or direction of a friend relationship, it is possible to present those who are expected to purchase the product for the recommender. Because the two-way friend relationship is a stronger connection than the one-way friend relationship, the relationship a has the top priority. In the relationship b, the other user receives the recommendation email from the recommender whom the user regards as a friend, whereas, in the relationship c, the recommender is a stranger to the other user. Thus the second group has a higher priority than the third group when selecting candidates.

Fifth Example

The recommendation candidate selection unit 71 may sort the other users according to the viewing history or the purchase history in the history database 65 and select a specified number of prospective recommendations from the top as candidates. For example, the recommendation candidate selection unit 71 may sort the other users in order of the number of views or the number of purchases of products in the category corresponding to the recommended product, from largest to smallest.

Further, the recommendation candidate selection unit 71 may refer to the sent history and the purchase history and sort the other users in order of response to products in the category corresponding to the recommended product (in order of time from reception of the recommendation email to purchase of the product, from shortest to longest). This means to sort the other users in order of difference between the sent date and time and the purchased date and time, from smallest to largest, corresponding to another product in the same category as the product indicated in the recommendation email generated by the recommendation email generation unit 72. In this case, a plurality of time differences corresponding to a plurality of recommended products are obtained in some cases on the basis of a plurality or sent histories and purchase histories in the past, which is different from the second example (the case where a difference between the sent date and time and the purchased date and time is obtained only for the recent recommendation email). In such a case, the recommendation candidate selection unit 71 may sort the other users based on statistics such as a median value or a mean value about differences in the sent date and time and the purchased date and time.

In this manner, by extracting the other user who has often viewed or purchased a product in the same category as the product indicated in the recommendation email or the other user who has purchased the product in quick response to the recommendation email as a candidate, it is possible to present those who are expected to purchase the product for the recommender.

The recommendation candidate selection unit 71 outputs a list of candidates for the other users selected by any of the above methods as candidate information to the page generation unit 67. The page generation unit 67 generates the recommendation email send page using the list.

The recommendation candidate selection unit 71 may allow the recommender to select a candidate selection method and extract candidates for the other users by the selected method. For example, candidates for the other users may be extracted using a method selected by the recommender among the methods shown in the above first to fifth examples.

The recommendation email generation unit 72 is a means of generating a recommendation email based on an instruction from a recommender. When a recommender enters necessary data in the recommendation email send page and presses the send button, the client 13 transmits data indicated in the page to the server 11. The Web server function 66 receives the data and outputs the data to the recommendation email generation unit 72.

The recommendation email generation unit 72 acquires the text of the recommendation email from the input data. Further, the recommendation email generation unit 72 acquires the nicknames of the other users actually specified by the recommender from the data and translates the nicknames into user IDs by reference to the user database 61. Then, the recommendation email generation unit 72 reads the email addresses corresponding to the user IDs of the other users from the user database 61. The recommendation email generation unit 72 then generates a recommendation email in which a predetermined title, a recommender ID, the acquired text of the recommendation email, the product information displayed on the recommendation email send page (product name, manufacturer or supplier name, URL of a sales page, price etc.) are shown and which is addressed to the read email addresses. In the recommendation email, the URL of a Web page selling the recommended product is placed as a link. The recommendation email generation unit 72 outputs the generated recommendation email to the recommendation email sending unit 73.

Note that the text of the recommendation email is an example of recommendation information. The recommendation information may be in any form as long as it is information for recommending a product, and thus the recommendation information may be indicated in a form different from the text of an email. For example, the level (1, 2, 3 and the like) or the ranking (for example, ranking indicated as "top n ranks") of the evaluation of the recommended product specified by a recommender may be added or attached to the recommendation email.

The recommendation email sending unit 73 is a means of sending the recommendation email that is input from the recommendation email generation unit 72 to each of the other users designated.

The purchase email generation unit 74 is a means of generating a purchase email indicating that the other user has purchased the recommended product indicated in the recommendation email. When one of the other users (purchaser) enters necessary data in the purchase email send page and presses the send button, the client 14 transmits data indicated in the page to the server 11. The input data contains the text of the purchase email (for example, "this is a really good item!"). The Web server function 66 receives the data and outputs the data to the purchase email generation unit 74.

The purchase email generation unit 74 acquires the text of the purchase email from the input data. Further, the purchase email generation unit 74 reads the sent history corresponding to the purchaser and the purchased product from the history database 64, specifies the email addresses of the other users who have received the same recommendation email as the one sent to the purchaser and acquires the email address of the recommender who is the sender of the recommendation email from the user database 61. Then, the purchase email generation unit 74 generates a purchase email in which a predetermined title, the acquired text of the purchase email, the product information displayed on the purchase email send page (product name, manufacturer or supplier name, URL of a sales page, price etc.) are shown and which is addressed to the read email addresses. The destination addresses of the purchase email do not include the email address of the purchaser. The purchase email generation unit 74 outputs the generated purchase email to the purchase email sending unit 75.

Note that the text of the purchase email is an example of purchase information (application information). The purchase information may be in any form as long as it is information indicating that a product is purchased, and thus the purchase information may be indicated in a form different from the text of an email. For example, a purchase price, the evaluation of a product, a product image and the like may be used as the purchase information. The purchase email may contain information identifying a purchaser (for example, a nickname), purchased date and time or the like.

The purchase email sending unit 75 is a means of sending the purchase email that is input from the purchase email generation unit 74 to the recommender and the other users.

The recommendation history update unit 76 is a means of updating the recommendation history in the history database 64. Upon sending of the recommendation email by the recommendation email sending unit 73, the recommendation history update unit 76 updates the records of the recommender and the other users corresponding to the recommendation email. The items to be updated are the sent date and time, the recommended product, the purchase record, the purchased date and time, and the number of emails sent. The purchase record is updated to "no purchase", and the purchased date and time are cleared. Further, upon sending of the purchase email by the purchase email sending unit 75, the recommendation history update unit 76 updates the records of the purchaser. Specifically, the purchase record of the purchaser is updated to "purchase", and the date and time the purchase email is sent are set to the purchased date and time.

The sent history recording unit 77 is a means of storing the sent history of recommendation emails sent by the recommendation email sending unit 73 and the sent history of purchase emails sent by the purchase email sending unit 75 into the history database 64.

The payment processing unit 78 is a means of performing a process of paying rewards to a recommender when the other user purchases a product through a Web page indicated by product information in the recommendation email. In other words, the payment processing unit 78 performs a process regarding affiliate payouts. The payment for the affiliate is not limited to be made by cash, and the payment may be made by points that can be exchanged for a product or the like.

A process of recommending a product from a user of the client 13 to users of the clients 14 (information providing method) is described hereinafter with reference to FIGS. 11 to 14.

First, in the server 11, the page generation unit 67 generates a sales page in response to HTTP request from the client 13, and the Web server function transmits the sales page to the client 13 (Step S1001, S1002).

The client 13 receives and displays the sales page (Step S2001, S2002). In this sales page, when a link to a recommendation email send page is clicked, the client 13 requests the send page to the server 11 (Step S2003).

In the server 11, the Web server function receives the HTTP request, and the page generation unit 67 generates an authentication page in response to the HTTP request (Step S1003, S1004). Then, the Web server function 66 transmits the authentication page to the client 13 (Step S1005).

The client 13 receives and displays the authentication page (Step S2004, S2005). In this authentication page, when a user ID and password are entered and a button for authentication is clicked, the client 13 acquires the user ID and password and transmits them to the server 11 (Step S2006, S2007).

In the server 11, the Web server function 66 receives the user ID and password (Step S1006). Then, the authentication unit 68 authenticates the user of the client 13 by verifying those user ID and password against the user ID and password stored in the user database 61 (Step S1007).

When the user of the client 13 is authenticated, the recommendation candidate selection unit 71 selects candidates for the other users (Step S1008). The recommendation candidate selection unit 71 can select candidates using various methods such as the above first to fifth examples. Then, the page generation unit 67 generates a recommendation email send page (Step S1009), and the Web server function 66 transmits the recommendation email send page to the client 13 (Step S1010).

The client 13 receives and displays the recommendation email send page (Step S2008, S2009). When, in this page, the other users are selected, the text of a recommendation email is entered, and the send button is clicked, the client 13 acquires the text and data indicating the other users and transmits those data to the server 11 (Step S2010, S2011).

In the server 11, the Web server function 66 receives the text of a recommendation email and the data indicating the other users (Step 1011; first acquisition step). Then, the recommendation email generation unit 72 generates a recommendation email using those data (Step S1012, first generation step), and the recommendation email sending unit 73 sends the recommendation email to the other users selected by the recommender (Step S1013, fist sending step). The recommendation email is received by each of the clients 14 (Step S3001, S4001, S5001). In the server 11, the recommendation history update unit 76 updates the recommendation history upon sending of the recommendation email (Step S1014), and the sent history recording unit 77 stores the sent history of the recommendation email into the history database 64 (Step S1015).

When a user of the client 14, which is one of the other users, clicks a link to the sales page of the product (recommended product) indicated in the recommendation email, the client 14 requests the sales page (Step S3002).

In the server 11, the Web server function 66 receives the HTTP request (Step S1016). Then, the page generation unit 67 generates the sales page of the recommended product in response to the HTTP request (Step S1017), and the Web server function 66 sends the sales page to the client 14 (Step S1018).

The client 14 receives and displays the sales page (Step S3003, S3004). When the user of the client 14 executes a series of operations to purchase the product (for example, operation of adding a product to a shopping cart, operation of entering a user ID and password, operation of designating a payment method and the like) on the sales page, the client 14 acquires data of application for purchase (application data) and transmits the data to the server 11 (Step S3005, S3006).

In the server 11, the Web server function 66 receives the application data (Step S1019). Then, the sales processing unit 69 executes a sales process (Step S1020), and the payment processing unit 78 performs an affiliate payment process for the recommender (S1021). After that, the page generation unit 67 generates a purchase email send page (Step S1022), and the Web server function 66 transmits the purchase email send page to the client 14 of the purchaser (Step S1023).

The client 14 of the purchaser receives and displays the purchase email send page (Step S3007, S3008). When the purchaser enters the text of a purchase email in the purchase email send page, the client 14 acquires the text and transmits it to the server 11 (S3009, S3010).

In the server 11, the Web server function 66 receives the text of a purchase email (Step S1024, second acquisition step). Then, the purchase email generation unit 74 generates a purchase email containing the text (Step S1025, second generation step), and the purchase email sending unit 75 sends the purchase email to the recommender and the other users other than the purchaser (Step S1026, second sending step). The purchase email is received by the client 13 and the clients 14 of the users other than the purchaser (Step S2012, S4002, S5002). After that, the recommendation history update unit 76 updates the records about the purchaser in the recommendation history (Step S1027), and the sent history recording unit 77 stores the sent history about the purchase email into the history database 64 (Step S1028). The recommendation process by the recommendation email and the purchase email thereby ends.

When a user of another client 14 purchases the recommended product, the above process is performed in the same way, and the purchase email is sent to the recommender and the other users (other than the purchaser of the recommended product). Thus, a plurality of purchase emails can be sent.

The above-described process may be executed by hardware or software. In the case of executing the process by software, a program constituting the software is installed to a computer from a program recording medium.

It should be noted that the program executed by a computer may be a program that is processed in a time sequence according to the order shown in this embodiment or a program that is processed in parallel or at a necessary timing such as when called.

As described above, according to this embodiment, when any of a plurality of other users who have received a recommendation email purchases a product indicated in the recommendation email, a purchase email indicating the purchase is generated and sent to the other users other than the purchaser. In this manner, by showing the fact that someone has actually purchased the product to the other users who have not yet purchased the product, it is expected that an intention to purchase the product occurs to the other users, thereby making a recommendation of a product with high efficiency. If the other users purchase the product in response to the purchase email, it is expected that the satisfaction level of the recommender increases.

If a framework for a recommender to receive rewards for the affiliate is prepared as in this embodiment, the recommender can obtain a monetary satisfaction as well. Specifically, more rewards can be gained as more products are purchased.

The embodiment of the present invention is described in detail above. However, the present invention is not restricted to the above-described embodiment, and various changes and modifications may be made without departing from the scope of the invention.

Although the server 11 includes the payment processing unit 78 in the above embodiment, the payment processing unit 78 may be omitted. In other words, a process for payment of the affiliate can be skipped.

The databases 61 to 64 may be placed on a computer different from the server 11. In this case, the server 11 may access those databases through a network.

Although a product is recommended using the recommendation email by the server 11, a target of recommendation is not limited to a product. For example, a target of recommendation may include invitation to membership or membership card, entry into campaign and the like. Thus, the type of applications is also not limited to an application for purchase, and there may be various different applications such as application for membership and application for entry.

REFERENCE SIGNS LIST

1 . . . Information providing system, 11 . . . Server (information providing apparatus), 12 . . . Internet, 13, 14 . . . Client, 15 . . . User relationship database (second storage unit), 16 . . . User ID translation table, 61 . . . User database, 62 . . . Product database, 63 . . . Mailing list database, 64 . . . History database (first, third, fourth, fifth, and sixth storage units), 65 . . . Initial data generation unit, 65 . . . History database, 66 . . . Web server function (first acquisition unit, second acquisition unit), 67 . . . Page generation unit, 68 . . . Authentication unit, 69 . . . Sales processing unit, 70 . . . Recommendation unit, 71 . . . Recommendation candidate selection unit, 72 . . . Recommendation email generation unit (first generation unit), 73 . . . Recommendation email sending unit (first sending unit), 74 . . . Purchase email generation unit (second generation unit), 75 . . . Purchase email sending unit (second sending unit), 76 . . . Recommendation history update unit, 77 . . . Sent history recording unit, 78 . . . Payment processing unit

The invention claimed is:

1. An information providing apparatus, including at least one processor, comprising:
    a first acquisition unit, within said processor, that acquires recommendation information indicating that a first user recommends a specified recommended object to a plurality of second users from a terminal of the first user, the first user and the plurality of second users forming a group;
    a first generation unit, within said processor, that generates a first recommendation email for recommending the recommended object to the plurality of second users based on the recommendation information;
    a first sending unit, within said processor, that sends the first recommendation email to the plurality of second users;
    a second acquisition unit that, within said processor, when one of the plurality of second users applies for the recommended object indicated in the first recommendation email and becomes an applicant for the recommended object, acquires application information indicating an application for the recommended object from a terminal of the applicant;
    a second generation unit, within said processor, that generates a second recommendation email containing the application information; and
    a second sending unit, within said processor, that sends the second recommendation email to the first user and remainder of the plurality of second users other than the applicant.

2. The information providing apparatus according to claim 1, further comprising:
    a selection unit, within said processor, that selects a plurality of candidates for the second users by reference to a first storage unit that stores recommendation data associating the first user and the second users, and transmits candidate information indicating the selected plurality of candidates to the terminal of the first user,
    wherein the first acquisition unit acquires the recommendation information indicating the plurality of second users specified from the candidates indicated by the candidate information in the terminal of the first user.

3. The information providing apparatus according to claim 2, wherein
    the recommendation data contains a sent date and time of the first recommendation email which has been recently sent to the second users as attribute information of the second users, and
    the selection unit selects the plurality of candidates in descending order of the sent date and time.

4. The information providing apparatus according to claim 2, wherein
    the recommendation data contains a sent date and time of the first recommendation email which has been recently sent to the second users, a recommended object indicated in the first recommendation email, and an applied date and time for the recommended object as attribute information of the second users, and
    the selection unit selects the plurality of candidates in order of time from the sent date and time to the applied date and time, from shortest to longest.

5. The information providing apparatus according to claim 2, wherein
    the recommendation data contains the number of first recommendation emails sent to the second users as attribute information of the second users, and
    the selection unit selects the plurality of candidates in descending order of the number of first recommendation emails.

6. The information providing apparatus according to claim 2, wherein
    the recommendation data contains a category of a recommended object corresponding to an interest of the second users as attribute information of the second users, and
    the selection unit selects the plurality of candidates in order of degree of coincidence between a category of a recommended object recommended by the first user and a category of a recommended object indicated by the recommendation data, from highest to lowest.

7. The information providing apparatus according to claim 2, wherein
    the selection unit refers to a second storage unit that stores relationship data indicating a relationship between users represented by a directed graph and specifies the second users in a two-way friend relationship with the first user, the second users in a one-way friend relationship to the first user and the second users in a one-way friend relationship from the first user as a first group, a second group and a third group, respectively, and selects the plurality of candidates in order of the first group, the second group and the third group.

8. The information providing apparatus according to claim 2, wherein
    the selection unit refers to a third storage unit that stores a sent history indicating sent date and time of a first recommendation email and a recommended object indicated in the first recommendation email and a fourth storage unit that stores an application history indicating recommended objects applied by the second users and applied date and time, and selects the plurality of candidates in order of difference between the sent date and time and the applied date and time, from smallest to largest, corresponding to other recommended objects in the same category as the recommended object indicated in the first recommendation email generated by the first generation unit.

9. The information providing apparatus according to claim 2, wherein
the selection unit refers to a fifth storage unit that stores a viewing history indicating recommended objects viewed by the second users and viewed date and time, and selects the plurality of candidates in order of the number of views of other recommended objects in the same category as the recommended object indicated in the first recommendation email generated by the first generation unit.

10. The information providing apparatus according to claim 2, wherein
the selection unit refers to a sixth storage unit that stores an application history indicating recommended objects applied by the second users and applied date and time, and selects the plurality of candidates in order of the number of applications for other recommended objects in the same category as the recommended object indicated in the first recommendation email generated by the first generation unit.

11. The information providing apparatus according to claim 1, wherein
the recommended object is a product, and the application for the recommended object is an application for purchase of a product.

12. The information providing apparatus according to claim 1, further comprising:
a selection unit, within said processor, that selects a plurality of candidates for the second users by reference to a first storage unit that stores recommendation data associating the first user and the second users, and transmits candidate information indicating the selected plurality of candidates to the terminal of the first user,
wherein the first acquisition unit acquires the recommendation information indicating the plurality of second users specified from the candidates indicated by the candidate information in the terminal of the first user, and
the selection unit selects the plurality of candidates in order based on at least one of an attribute of the first recommendation email sent to the second user in the past, a relationship between the first user and the second user represented by a directed graph, and a history of the recommended object viewed or applied by the second user.

13. An information providing method executed by an information providing apparatus, comprising:
a first acquisition step of acquiring recommendation information indicating that a first user recommends a specified recommended object to a plurality of second users from a terminal of the first user, the first user and the plurality of second users forming a group;
a first generation step of generating a first recommendation email for recommending the recommended object to the plurality of second users based on the recommendation information;
a first sending step of sending the first recommendation email to the plurality of second users;
a second acquisition step of, when one of the plurality of second users applies for the recommended object indicated in the first recommendation email and becomes an applicant for the recommended object, acquiring application information indicating an application for the recommended object from a terminal of the applicant;
a second generation step of generating a second recommendation email containing the application information; and
a second sending step of sending the second recommendation email to the first user and remainder of the plurality of second users other than the applicant.

14. A non-transitory computer-readable recording medium having an information providing program recorded therein, the program causing a computer to implement:
a first acquisition unit that acquires recommendation information indicating that a first user recommends a specified recommended object to a plurality of second users from a terminal of the first user, the first user and the plurality of second users forming a group;
a first generation unit that generates a first recommendation email for recommending the recommended object to the plurality of second users based on the recommendation information;
a first sending unit that sends the first recommendation email to the plurality of second users;
a second acquisition unit that, when one of the plurality of second users applies for the recommended object indicated in the first recommendation email and becomes an applicant for the recommended object, acquires application information indicating an application for the recommended object from a terminal of the applicant;
a second generation unit that generates a second recommendation email containing the application information; and
a second sending unit that sends the second recommendation email to the first user and remainder of the plurality of second users other than the applicant.

* * * * *